(12) United States Patent
Park et al.

(10) Patent No.: US 10,782,048 B2
(45) Date of Patent: Sep. 22, 2020

(54) DEEP FREEZER

(71) Applicant: LG Electronics Inc., Seoul (KR)

(72) Inventors: Yongjoo Park, Seoul (KR); Kangsoo Byun, Seoul (KR); Hyunsoo Song, Seoul (KR); Sanggyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 16/069,952

(22) PCT Filed: Jan. 13, 2017

(86) PCT No.: PCT/KR2017/000463
§ 371 (c)(1),
(2) Date: Jul. 13, 2018

(87) PCT Pub. No.: WO2017/123042
PCT Pub. Date: Jul. 20, 2017

(65) Prior Publication Data
US 2019/0024948 A1    Jan. 24, 2019

(30) Foreign Application Priority Data

Jan. 15, 2016 (KR) .......................... 10-2016-0005161
Jan. 15, 2016 (KR) .......................... 10-2016-0005172
Jun. 27, 2016 (KR) .......................... 10-2016-0080123

(51) Int. Cl.
*F25B 1/00* (2006.01)
*F25B 5/04* (2006.01)
(Continued)

(52) U.S. Cl.
CPC ................ *F25B 1/00* (2013.01); *C09K 5/042* (2013.01); *F25B 5/04* (2013.01); *F25B 7/00* (2013.01);
(Continued)

(58) Field of Classification Search
CPC .......... F25B 1/00; F25B 43/003; F25B 40/00; F25B 9/06; F25B 49/0022; F25B 7/00;
(Continued)

(56) References Cited

U.S. PATENT DOCUMENTS

2006/0065013 A1* 3/2006 Kurita ..................... F25B 40/00
62/513
2007/0137230 A1* 6/2007 Bae .......................... F25B 5/04
62/198

(Continued)

FOREIGN PATENT DOCUMENTS

KR    10-2004-0053696    6/2004
KR    10-0756880    9/2007
(Continued)

OTHER PUBLICATIONS

International Search Report in International Application No. PCT/KR2017/000463, dated May 1, 2017, 32 pages (with English translation).

*Primary Examiner* — Emmanuel E Duke
(74) *Attorney, Agent, or Firm* — Fish & Richardson P.C.

(57) ABSTRACT

An embodiment of the present invention relates to a deep freezer. A deep freezer according to an embodiment of the present invention comprises a plurality of heat exchangers installed to an inlet pipe and performing a heat exchange of a mixed refrigerant suctioned into a compressor. The mixed refrigerant comprises: a high temperature refrigerant which is one selected from among butane (N-butane), 1-butene, and isobutane; and a low temperature refrigerant consisting of ethylene.

14 Claims, 9 Drawing Sheets

(51) Int. Cl.
*F25B 7/00* (2006.01)
*F25B 49/02* (2006.01)
*C09K 5/04* (2006.01)
*F25B 9/06* (2006.01)
*F25B 40/00* (2006.01)
*F25B 43/00* (2006.01)

(52) U.S. Cl.
CPC ............... *F25B 9/06* (2013.01); *F25B 40/00* (2013.01); *F25B 43/003* (2013.01); *F25B 49/022* (2013.01); *C09K 2205/12* (2013.01); *C09K 2205/34* (2013.01); *F25B 2400/0409* (2013.01); *F25B 2400/0411* (2013.01); *F25B 2400/052* (2013.01); *F25B 2400/054* (2013.01)

(58) Field of Classification Search
CPC ............... F25B 5/04; F25B 2400/052; F25B 2400/054; F25B 2400/0411; F25B 2400/0409; C09K 5/042; C09K 2205/12; C09K 2205/34
See application file for complete search history.

(56) References Cited

U.S. PATENT DOCUMENTS

| | | | |
|---|---|---|---|
| 2007/0180853 A1* | 8/2007 | Lim | F25B 40/00 62/513 |
| 2008/0178621 A1* | 7/2008 | Kang | F25B 5/04 62/179 |
| 2010/0100243 A1* | 4/2010 | Lee | F25D 11/022 700/275 |
| 2010/0126200 A1* | 5/2010 | Oh | F25D 17/065 62/335 |
| 2010/0243200 A1* | 9/2010 | Baker, Jr. | B60H 1/00342 165/41 |
| 2013/0111943 A1* | 5/2013 | Yoon | F25B 9/006 62/498 |

FOREIGN PATENT DOCUMENTS

| | | |
|---|---|---|
| KR | 10-0808180 | 2/2008 |
| KR | 10-2012-0026157 | 3/2012 |
| KR | 10-2015-0076685 | 7/2015 |

* cited by examiner

DEEP FREEZER

CROSS-REFERENCE TO RELATED APPLICATIONS

This application is a National Stage application under 35 U.S.C. § 371 of International Application No. PCT/KR2017/000463, filed on Jan. 13, 2017, which claims the benefit of Korean Application No. 10-2016-0005161, filed on Jan. 15, 2016, Korean Application No. 10-2016-0005172, filed on Jan. 15, 2016, and Korean Application No. 10-2016-0080123, filed on Jun. 27, 2016. The disclosures of the prior applications are incorporated by reference in their entirety.

TECHNICAL FIELD

Embodiments of the present invention relate to a deep freezer.

BACKGROUND ART

A deep freezer is an apparatus for driving a freezing cycle in order to maintain a storage compartment at a very low temperature of −60° C. to −80° C.

In order to implement the freezing cycle, a refrigerant having a low boiling point may be used. However, if the refrigerant having the low boiling point is used alone, the discharge pressure of a compressor increases, thereby deteriorating reliability of the compressor.

Accordingly, in a freezing cycle for realizing a deep temperature, a mixture of two or more refrigerants having different boiling points may be used. The refrigerant mixture includes a refrigerant mixture, the temperature of which is not changed in a quasi-equilibrium state when liquefaction or vaporization occurs between liquid and gas at a predetermined pressure, that is, an azeortropic refrigerant mixture, and a non-azeortropic refrigerant mixture, the temperature of which is changed in a liquefaction or vaporization process.

The azeortropic refrigerant mixture only with a special composition ratio exists and exhibits the same thermodynamic properties as pure materials. In contrast, the evaporation pressure or temperature of the non-azeortropic refrigerant mixture may be changed according to the composition thereof.

Meanwhile, since it is difficult for the azeortropic refrigerant mixture to realize a deep temperature (very low temperature), the non-azeortropic refrigerant mixture may be used to realize the deep temperature.

However, even if the non-azeortropic refrigerant mixture is used, the discharge pressure or condensing pressure of the compressor is high. Accordingly, it is necessary to select a compressor in the discharge pressure range. In general, the compressor used for the deep freezer may be a commercial compressor having a large operating pressure range, that is, a high discharge pressure.

However, the commercial compressor has a problem that operation reliability of the deep freezer is deteriorated due to large operation noise.

Meanwhile, information on the prior art related to the deep freezer is as follows.

1. Registration number (registration date): U.S. Pat. No. 7,299,653B2 (Nov. 27, 2007)

2. Title of the Invention: Refrigerator system using non-azeotropic refrigerant, and non-azeotropic refrigerant for very low temperature used for the system.

According to the prior art, a deep temperature environment may be realized using a mixture of two or more refrigerants. However, since a mixing ratio of the mixture is not optimized, it is difficult to obtain appropriate discharge pressure of a compressor while realizing a deep temperature.

Specifically, when a ratio of a refrigerant having a high boiling point is high, it is difficult to realize a deep temperature. When a ratio of a refrigerant having a low boiling point is high, the discharge pressure of the compressor is increased, thereby deteriorating reliability of the compressor.

Meanwhile, in the freezing cycle disclosed in the prior art, the refrigerant discharged from the compressor is condensed in a condenser and then is heat-exchanged with an evaporative refrigerant, thereby realizing a deep temperature by heat exchange. However, the dryness of the refrigerant is increased in an expansion process of an expansion device after heat exchange and thus the ratio of a liquid refrigerant in the refrigerant flowing into an evaporator is decreased, thereby reducing cooling power.

DISCLOSURE

Technical Problem

An object of the present invention devised to solve the problem lies in a deep freezer capable of realizing a desired very low temperature environment.

Another object of the present invention devised to solve the problem lies in a deep freezer capable of decreasing condensing pressure of a freezing cycle.

Another object of the present invention devised to solve the problem lies in a deep freezer capable of reducing noise generated by a compressor to increase reliability of the compressor.

Technical Solution

The object of the present invention can be achieved by providing a deep freezer including a plurality of heat exchangers installed in a suction pipe to perform heat exchange of a refrigerant mixture sucked into a compressor.

The plurality of heat exchangers may include a first heat exchanger, and the first heat exchanger may include a first suction heat exchanger for guiding flow of the refrigerant mixture sucked into the compressor and a condensing heat exchanger for performing heat exchange with the first suction heat exchanger and guiding flow of a condensing pipe.

A length of the first suction heat exchanger or the condensing heat exchanger may be in a range of 3.5 to 5 m.

A diameter of a pipe of the condensing heat exchanger may be greater than that of the expansion device.

A diameter of a pipe of the condensing heat exchanger may be 3.5 times to 4.5 times that of the expansion device.

The plurality of heat exchangers may include a second heat exchanger, and the second heat exchanger may include a second suction heat exchanger provided at one side of the first suction heat exchanger to guide flow of the refrigerant mixture sucked into the compressor and an expansion device for performing heat exchange with the second suction heat exchanger.

The first suction heat exchanger and the condensing pipe or the second suction heat exchanger and the expansion device may be in contact with each other to perform heat exchange.

The first suction heat exchanger and the condensing pipe or the second suction heat exchanger and the expansion device may be coupled by soldering.

The deep freezer may further include a heat exchanger connection pipe disposed between the first and second heat exchangers to prevent heat exchange between the expansion device and the condensing heat exchanger, and the first heat exchanger and the second heat exchanger may be spaced apart from each other by the heat exchanger connection pipe.

The first heat exchanger may be installed at an outlet side of the second heat exchanger with respect to a flow direction of the refrigerant flowing through the suction pipe.

The second heat exchanger may be installed at an outlet side of the first heat exchanger with respect to a flow direction of the refrigerant flowing through the condensing pipe.

An evaporator may include a first evaporator and a second evaporator connected in series and the second evaporator may be installed at an outlet side of the first evaporator.

The evaporator may include a first evaporator and a second evaporator connected in parallel, and the expansion device may include a first expansion device installed at an inlet side of the first evaporator and a second expansion device installed at an inlet side of the second evaporator.

The first and second expansion devices and the suction pipe may be coupled to each other to exchange heat with each other.

The evaporator may include a first evaporator installed at an outlet side of the expansion device, a second evaporator connected to an outlet side of the first evaporator in series, and a third evaporator connected to an outlet side of the second evaporator in series.

Two independent freezing cycles may operate, and each of the independent freezing cycles may include the compressor, the condenser, the expansion device, the evaporator and the plurality of heat exchangers.

The deep freezer according to the embodiment of the present invention may include a compressor for compressing the refrigerant mixture. The refrigerant mixture may include a high-temperature refrigerant selected from among N-butane, 1-butane and isobutene and a low-temperature refrigerant composed of ethylene.

The refrigerant mixture may include N-butane and ethylene.

N-butane may be in a range of 80 wt % to 85 wt %, and ethylene may be in a range of 15 wt % to 20 wt %.

The compressor may operate in a set pressure range, and the set pressure range may include a maximum discharge pressure of the compressor of 25 bar or less.

The set pressure range may include a minimum suction pressure of the compressor of 1 bar or more.

The compressor may operate in a set temperature range, and the set temperature range may include a maximum discharge temperature of the compressor of 120° C. or less.

The deep freezer may include a storage compartment having a temperature value of −60° C. or less.

The compressor includes a household compressor operating under a pressure condition in which a minimum suction pressure is 1 bar or more and a maximum discharge pressure is 25 bar or less.

The deep freezer may further include a condensing pipe extending from an outlet side of the condenser to the expansion device to guide flow of the refrigerant mixture, a suction pipe extending from an outlet side of the evaporator to the compressor to guide suction of the refrigerant mixture into the compressor, and a plurality of heat exchangers installed in the suction pipe to perform heat exchange of the refrigerant mixture sucked into the compressor.

Advantageous Effects

According to the embodiments of the present invention, a refrigerant condensed in a condenser passes through a plurality of heat exchangers before being introduced into an evaporator, thereby decreasing the condensing pressure of a freezing cycle and preventing dryness of the refrigerant from being increased when the condensed refrigerant passes through an expansion device.

In more detail, since the plurality of heat exchangers includes a first heat exchanger for performing heat exchange between the refrigerant passing through the condenser and the refrigerant sucked into a compressor, the condensing pressure of the freezing cycle may be decreased in the heat exchange process of the first heat exchanger. As a result, it is possible to use a household compressor having a low discharge pressure and low noise, which is used in a general refrigerator.

In addition, it is possible to prevent liquid refrigerant from being introduced into the compressor due to increase in temperature of the sucked refrigerant, thereby improving operation reliability of the compressor.

In addition, since the plurality of heat exchangers includes a second heat exchanger for performing heat exchange between the refrigerant passing through the expansion device and the refrigerant sucked into the compressor after heat exchange in the first heat exchanger, it is possible to prevent the dryness of the refrigerant from being increased in a process of decompressing the refrigerant in the expansion device.

As a result, the ratio of the liquid refrigerant in the refrigerant introduced into the evaporator, thereby improving the amount of evaporation heat, that is, cooling power.

In addition, since the diameter of a condensing heat exchanger configuring the first heat exchanger is greater than that of the expansion device configuring the second heat exchanger, refrigerant can be easily condensed when passing through the first heat exchanger and thus a condensing temperature and condensing pressure can be reduced.

In addition, since heat exchange may be performed by setting the length of the first heat exchanger in an optimal range, it is possible to satisfy the operation condition of a household compressor and to improve operation reliability of the compressor in view of the characteristics of the refrigerant cycle.

Since the first heat exchanger is configured by coupling a condensing pipe and a suction pipe and the second heat exchanger is configured by coupling a capillary tube and a suction pipe, it is possible to improve heat exchange efficiency.

In addition, since the condensed refrigerant passing through the condenser is heat-exchanged in the first heat exchanger and is introduced into the second heat exchanger, it is possible to first reduce condensing pressure and to prevent dryness from being increased in an expansion process.

In addition, since the weight ratio of a non-azeotropic refrigerant mixture can be optimized, it is possible to implement a desired very low temperature environment and to satisfy appropriate discharge pressure of the household compressor.

BEST MODE

Hereinafter, embodiments of the present invention will be described with reference to the drawings. It is to be understood, however, that the spirit of the invention is not limited to the embodiments and that those skilled in the art, upon reading and understanding the spirit of the invention, may easily suggest other embodiments within the scope of the same concept.

Figure 1:
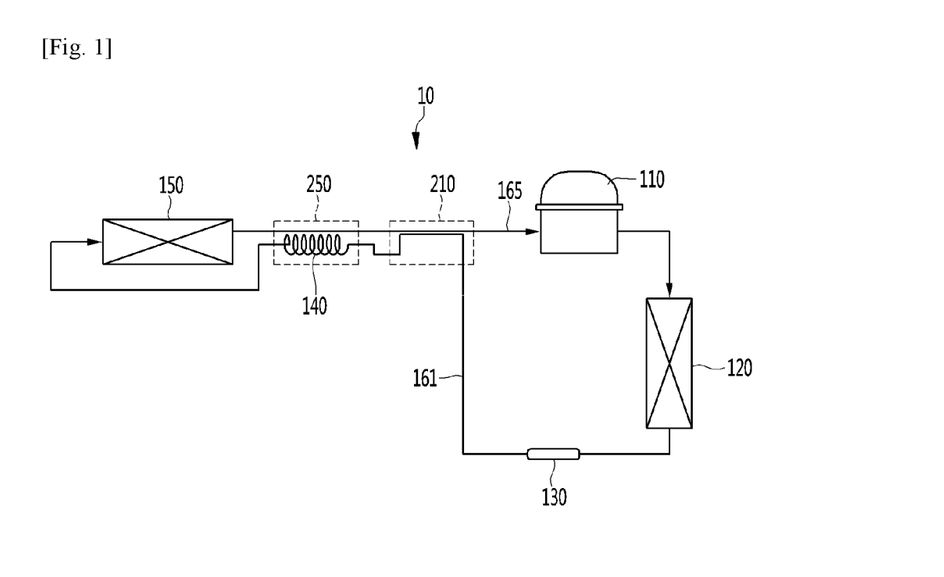
FIG. 1 is a view showing a freezing cycle of a deep freezer according to a first embodiment of the present invention.
Figure 2:
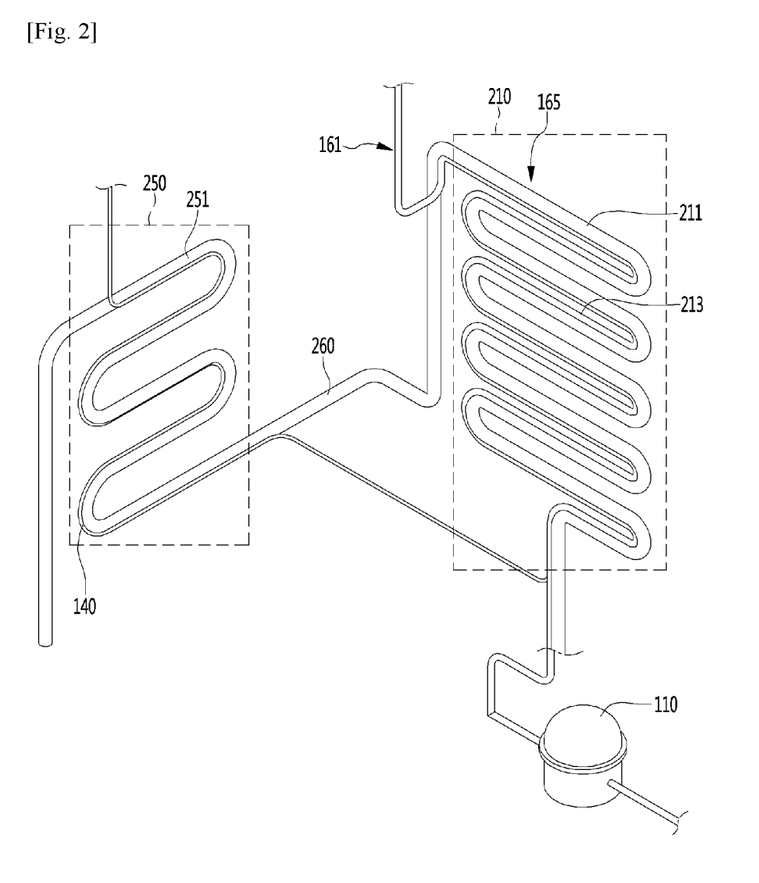
FIG. 2 is a view showing the configuration of first and second heat exchangers according to the first embodiment of the present invention.
Figure 3:
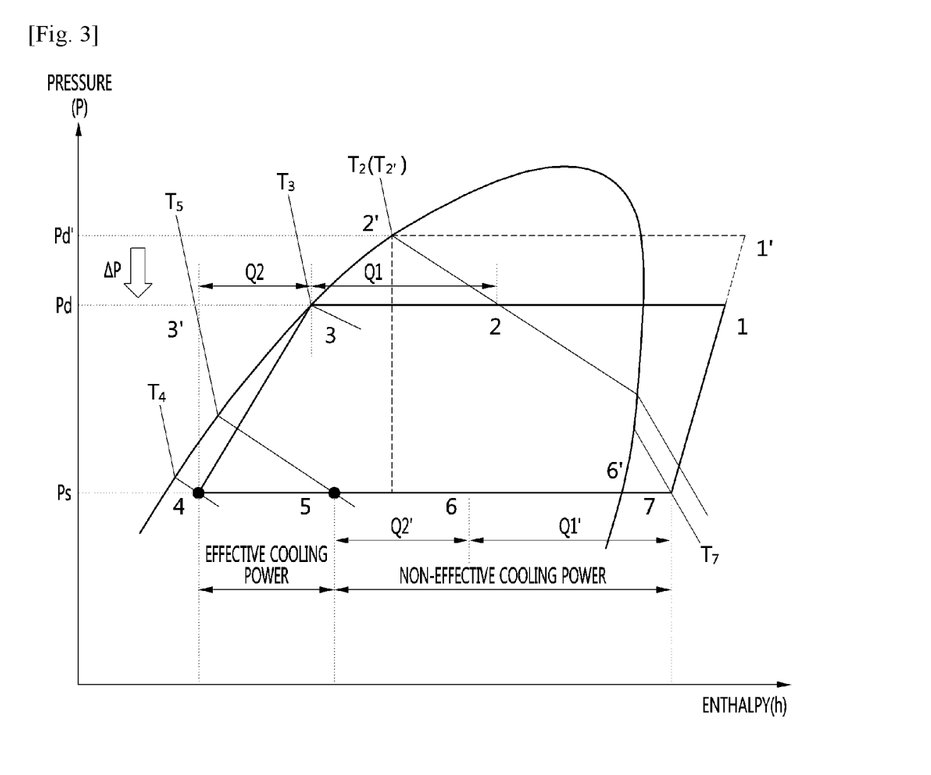
FIG. 3 is a P-h diagram of the deep freezer according to the first embodiment of the present invention.
Figure 4:
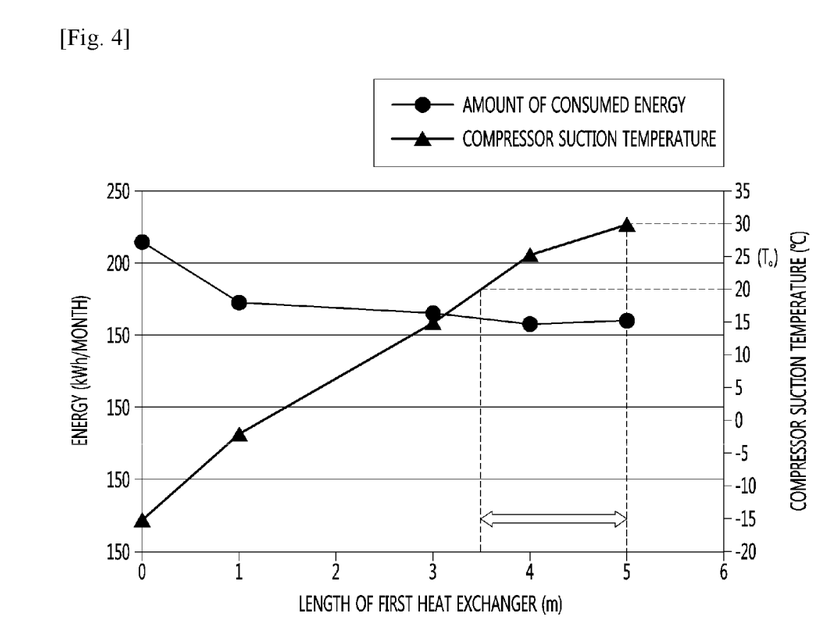
FIG. 4 is an experimental graph showing an optimal range of the length of the first heat exchanger according to the first embodiment of the present invention.
Figure 5:
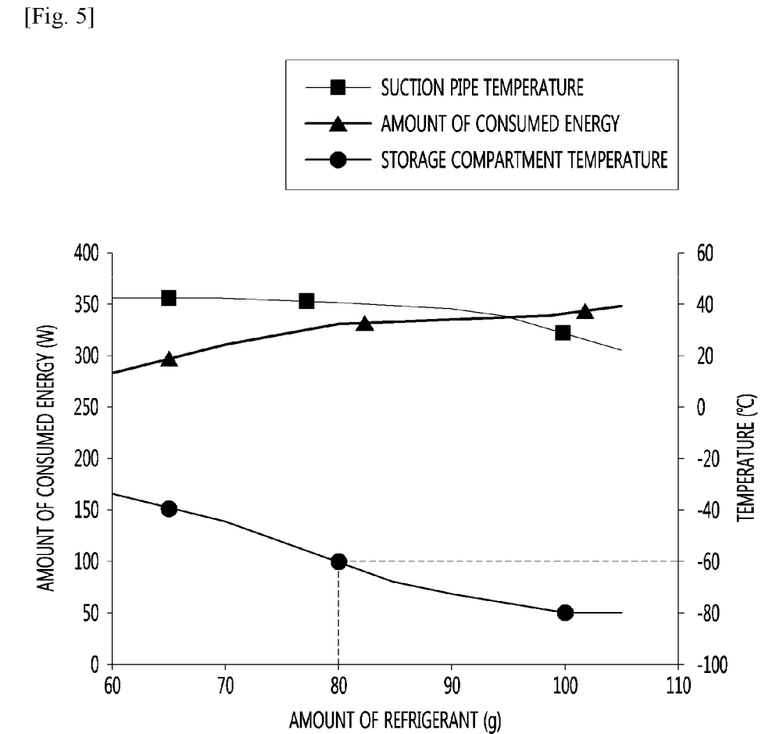
FIG. 5 is an experimental graph showing a plurality of result values changed according to the amount of refrigerant of a non-azeotropic refrigerant mixture according to the first embodiment of the present invention.

FIG. 1 is a view showing a freezing cycle of a deep freezer according to a first embodiment of the present invention, FIG. 2 is a view showing the configuration of first and second heat exchangers according to the first embodiment of the present invention, FIG. 3 is a P-h diagram of the deep freezer according to the first embodiment of the present invention, FIG. 4 is an experimental graph showing an optimal range of the length of the first heat exchanger according to the first embodiment of the present invention, and FIG. 5 is an experimental graph showing a plurality of result values changed according to the amount of refrigerant of a non-azeotropic refrigerant mixture according to the first embodiment of the present invention.

Referring to FIG. 1, in the deep freezer 10 according to the first embodiment, a freezing cycle in which refrigerant is repeatedly compressed, condensed, expanded and evaporated may be performed. A compressor 110 for compressing the refrigerant is included. The compressor 110 may include a household compressor used in a general household refrigerator.

For example, the temperature or pressure range of the compressor 110 is as follows. The compressor 110 may be configured to have a maximum discharge pressure of 25 bar or less, a maximum discharge temperature of 120° C. or less and a minimum suction pressure of 1 bar or less. The household compressor having such temperature or pressure ranges has an advantage that operation noise is very low.

The refrigerant sucked into the compressor 110 includes a refrigerant mixture. The refrigerant mixture includes a first refrigerant having a first boiling point and a second refrigerant having a second boiling point lower than the first boiling point. The first refrigerant may be referred to as a high-temperature refrigerant and the second refrigerant may be referred to as a low-temperature refrigerant.

As the refrigerant includes the refrigerant mixture, it is possible to realize an evaporation temperature required for the deep freezer, that is, a deep temperature (very low temperature), and to set the pressure of the refrigerant discharged from the compressor 110 within a set range.

Specifically, it is possible to realize a deep temperature by the characteristics of the low-temperature refrigerant. However, the low-temperature refrigerant has a relatively high discharge pressure when being compressed by the compressor 110, thereby adversely affecting reliability of the compressor, particularly, the household compressor 110 applied to the present embodiment. Accordingly, in order to lower the discharge pressure, a high-temperature refrigerant having a relatively low discharge pressure may be mixed.

By merely mixing the low-temperature refrigerant and the high-temperature refrigerant, the discharge pressure of the refrigerant mixture may be greater than the operation pressure of the household compressor 110 used in the present embodiment.

In order to solve such a problem, a commercial compressor having a large operation pressure range may be used. However, in this case, reliability of the deep freezer may be reduced by very high operation noise. Accordingly, in the present embodiment, a ratio of mixed refrigerants, that is, the high-temperature refrigerant and the low-temperature refrigerant, which may meet the operation pressure or temperature range of the household compressor 110, is proposed.

In general, the high-temperature refrigerant may include isopentane, 1,2-butadiene, N-butane, 1-butene or isobutane. The physical properties of the high-temperature refrigerant are shown in Table 1 below.

TABLE 1

| High-temperature refrigerant | Evaporation temperature (1 bar), ° C. | Evaporation temperature (20 bar), ° C. |
|---|---|---|
| ISOPENTANE | 27.5 | 154.7 |
| 1,2-BUTADIENE | 10.3 | 124.8 |
| N-BUTANE | −0.9 | 114.5 |
| 1-BUTENE | −6.6 | 105.8 |
| ISOBUTANE | −12 | 100.7 |

Based on the pressure of 1 bar, isopentane and 1,2-butadiene have slightly high evaporation temperatures. Accordingly, if isopentane and 1,2-butadiene are used as the high-temperature refrigerant according to the present embodiment, it is difficult to realize a deep temperature even when the high-temperature refrigerant is mixed with the low-temperature refrigerant.

In contrast, based on the pressure of 1 bar, N-butane, 1-butene and isobutene has have evaporation temperature of 0° C. or less. Accordingly, any one of N-butane, 1-butene and isobutene may be used as the high-temperature refrigerant according to the present embodiment in a broad sense.

However, the evaporation temperature of 1-butene or isobutene is slightly low. Therefore, when 1-butene or isobutene is mixed with the low-temperature refrigerant, a deep temperature may be realized, but the discharge pressure of the compressor may be slightly increased. Accordingly, as the high-temperature refrigerant according to the present embodiment, N-butane, the evaporation temperature of which is close to 0° C. based on the pressure of 1 bar, may be used.

Meanwhile, the low-temperature refrigerant may include ethane or ethylene. The physical properties of the low-temperature refrigerant are shown in Table 2 below.

TABLE 2

| Low-temperature refrigerant | Evaporation temperature (1 bar), °C. | Evaporation temperature (20 bar), °C. |
|---|---|---|
| ETHANE | −88.8 | −182.8 |
| ETHYLENE | −104 | −169.15 |

Based on the pressure of 1 bar, ethane has a slightly high evaporation temperature. Accordingly, if the ethane is used as the low-temperature refrigerant according to the present embodiment, it is difficult to realize a deep temperature.

In contrast, based on the pressure of 1 bar, ethylene has an evaporation temperature of −100° C. or less and the evaporation temperature of −100° C. or less is suitable for realizing the deep temperature. Accordingly, based on the pressure of 1 bar, ethylene having the evaporation temperature of −100° C. or less may be used as the low-temperature refrigerant according to the present embodiment.

As described above, even when N-butane is used as the high-temperature refrigerant and ethylene is used as the low-temperature refrigerant to realize the deep temperature, it is necessary to mix the refrigerants with an appropriate weight ratio in order to satisfy the discharge pressure range of the household compressor 110.

In the present embodiment, a ratio of mixed refrigerants satisfying the discharge pressure range of the household compressor 110 is proposed by repeating a plurality of experiments. For example, the weight ratio of N-butane may be determined in the range of 80 wt % to 85 wt % and the weight ratio of ethylene may be determined in the range of 15 wt % to 20 wt %.

Specifically, the result values of the plurality of repeated experiments are shown.

TABLE 3

| | Room temperature (32° C.) | | | | |
|---|---|---|---|---|---|
| | N-BUTANE/ETHYLENE (wt %) | | | | |
| | 70/30 | 75/25 | 80/20 | 85/15 | 90/10 |
| Maximum discharge pressure (bar) | 39.1 | 36.2 | 24.3 | 22.9 | 21.4 |
| Minimum suction pressure (bar) | 1.7 | 1.5 | 1.18 | 1.09 | 0.94 |
| Maximum discharge temperature (° C.) | 116.9 | 111.2 | 105.4 | 101.3 | 98.6 |
| Temperature performance (° C.) | −79.8 | −74.6 | −68.3 | −62.9 | −55.8 |

Table 3 above shows the results of experiments performed while changing the weight ratio of N-butane to ethylene when the ambient temperature (room temperature) is 32° C.

From the results, it can be seen that, as the weight percentage of N-butane in the refrigerant mixture of N-butane and ethylene is relatively increased, the maximum discharge pressure, minimum suction pressure and maximum discharge temperature of the compressor are decreased and the temperature performance, that is, the temperature value of the storage compartment realized in the deep temperature, is increased.

As described above, in order to satisfy the operation pressure and temperature ranges of the household compressor 110, the maximum discharge pressure should be 25 bar or less, the maximum discharge temperature should be 120° C. or less and the minimum suction pressure should be 1 bar or more.

The weight ratio of N-butane to ethylene satisfying such a condition is 80:20 to 85:15. Within such a weight ratio range, the temperature of the storage compartment capable of realizing performance required for the deep freezer may be −60° C. or less, for example.

TABLE 4

| | Room temperature (38° C.) | | | | |
|---|---|---|---|---|---|
| | N-BUTANE/ETHYLENE (wt %) | | | | |
| | 70/30 | 75/25 | 80/20 | 85/15 | 90/10 |
| Maximum discharge pressure (bar) | 40.8 | 38.3 | 24.8 | 23.6 | 22.2 |
| Minimum suction pressure (bar) | 1.9 | 1.6 | 1.25 | 1.14 | 0.98 |
| Maximum discharge temperature (° C.) | 121.3 | 118.4 | 108.3 | 103.6 | 101.8 |
| Temperature performance (° C.) | −76.5 | −72.4 | −66.7 | −61.9 | −53.2 |

Table 4 above shows the results of experiments performed while changing the weight ratio of N-butane to ethylene when the ambient temperature (room temperature) is 38° C.

From the results, it can be seen that, as the weight percentage of N-butane in the refrigerant mixture of N-butane and ethylene is relatively increased, the maximum discharge pressure, minimum suction pressure and maximum discharge temperature of the compressor are decreased and the temperature performance, that is, the temperature value of the storage compartment realized in the deep temperature, is increased.

As described above, in order to satisfy the operation pressure and temperature ranges of the household compressor 110, the maximum discharge pressure should be 25 bar or less, the maximum discharge temperature should be 120° C. or less and the minimum suction pressure should be 1 bar or more.

The weight ratio of N-butane to ethylene satisfying such a condition is 80:20 to 85:15. Within such a weight ratio range, the temperature of the storage compartment capable of realizing performance required for the deep freezer may be −60° C. or less, for example.

In summary, in order to achieve desired performance in a deep freezer 10 employing the household compressor 110, a refrigerant mixture having a ratio of N-butane to ethylene of 80:20 to 85:15 may be used.

FIG. 5 shows the results of experiments in which a refrigerant mixture is formed with a ratio of N-butane and ethylene of 83:17 and a storage compartment having a predetermined volume is cooled while the amount of refrigerant is increased.

More specifically, a graph showing the temperature of the refrigerant mixture sucked into the compressor 110, that is, the temperature of the suction pipe, the temperature of the storage compartment to be cooled and the amount of consumed energy according to operation of the deep freezer according as the amount of refrigerant is increased is shown.

As the amount of refrigerant mixture is increased, the temperature of the suction pipe tends to be gradually decreased, the temperature of the storage compartment is decreased, and the amount of consumed energy is gradually increased.

According to FIG. 5, in order to have the desired temperature performance of the deep freezer, that is, a value of −60° C. or less, the amount of refrigerant mixture needs to be 80 g or more. Of course, the amount of refrigerant mixture may be changed according to the volume of the storage compartment.

Referring to FIGS. 1 and 3, the configuration of the cycle and change in physical properties will be described. FIG. 3 shows a P-h diagram, in which a portion indicated by a dotted line represents a freezing cycle, which does not a plurality of heat exchangers 210 and 250 according to the present embodiment, according to the related art and a portion indicated by a solid line represents a freezing cycle having the configuration according to the present embodiment.

Specifically, a plurality of isothermal lines is displayed in the P-h diagram. The isothermal lines include T2(T2'), T3, T4, T5 and T7. The temperature value according to the isothermal lines may satisfy the following relationship: T2(T2')>T7>T3>T5>T4. For example, T2(T2') may be in a range of 35 to 40° C., T7 may be formed in a range of 30 to 35° C., T3 may be formed in a range of 8 to 13° C., T5 may be formed at −60° C., and T4 may be formed at −80° C.

The deep freezer according to the first embodiment of the present invention further includes a condenser 120 provided at the outlet side of the compressor 110 to condense the refrigerant mixture discharged from the compressor 110. The deep freezer 10 includes a drier 130 provided at the outlet side of the condenser 120 to filter out moisture or foreign materials from the refrigerant condensed in the condenser 120.

The deep freezer 10 further includes an expansion device 140 provided at the outlet side of the drier 130 to decompress the refrigerant condensed in the condenser 130. For example, the expansion device 140 may include a capillary tube. The deep freezer 10 further includes a condensing pipe 161 extending from the outlet side of the condenser 120 to the expansion device 140. The drier 130 may be installed in the condensing pipe 161.

The deep freezer 10 further includes an evaporator 150 provided at the outlet side of the expansion device 140 to evaporate the refrigerant decompressed in the expansion device 140. The deep freezer 10 further includes a suction pipe 165 extending from the outlet side of the evaporator 150 to the suction side of the compressor 110.

Cool air generated when the refrigerant mixture passes through the compressor 110, the condenser 120, the expansion device 140 and the evaporator 150 may be supplied to the storage compartment provided in the deep freezer 10.

The deep freezer 10 further includes a plurality of heat exchangers 210 and 250 for improving operation efficiency of the deep freezer 10. The plurality of heat exchangers 210 and 250 includes the first heat exchanger 210 for exchanging heat between the refrigerant flowing through the condensing pipe 161 and the refrigerant flowing through the suction pipe 165.

Specifically, the first heat exchanger 210 may include a first suction heat exchanger 211 and a condensing heat exchanger 213 for exchanging heat with the first suction heat exchanger 211. The first suction heat exchanger 211 may configure at least a portion of the suction pipe 165 and the condensing heat exchanger 213 may configure at least a portion of the condensing pipe 161.

The first suction heat exchanger 211 and the condensing heat exchanger 213 may be configured to be in contact with each other. For example, the first suction heat exchanger 211 and the condensing heat exchanger 213 may be coupled by soldering. When heat is exchanged between the first suction heat exchanger 211 and the condensing heat exchanger 213, the low-temperature refrigerant flowing in the first suction heat exchanger 211 may cool the high-temperature refrigerant flowing in the condensing heat exchanger 213.

Accordingly, the condensing pressure of the freezing cycle is decreased and thus the discharge pressure of the compressor 110 may be reduced. As the discharge pressure of the compressor 110 is reduced, the operation reliability of the household compressor 110 may be improved and noise may be reduced as described above.

Since heat of the refrigerant flowing in the first suction heat exchanger 211 may be absorbed, the ratio of the liquid refrigerant contained in the refrigerant, that is, non-effective cooling power, may be reduced. In addition, liquid refrigerant may be prevented from flowing into the compressor 110.

Specifically, referring to FIG. 3, the state of the refrigerant (point 1) compressed by the compressor 110 is changed to point 2 after passing through the condenser 120. The refrigerant is condensed while passing through the condensing heat exchanger 213 (heat quantity Q1) and, as a result, the condensing temperature is decreased from $T_2$ to $T_3$ and the condensing pressure is Pd.

In contrast, in the related art, the refrigerant compressed by the compressor is condensed only in the condenser. At this time, point 1' represents the state of the compressed refrigerant and point 2' represents the state of the refrigerant after passing through the condenser. That is, as compared with the present invention, the condensing pressure is Pd' higher than Pd, and the condensing temperature is $T_2$' higher than $T_3$. Here, $T_2$' has the same temperature value as $T_2$.

As a result, it can be seen that the refrigerant passing through the condenser 120 is heat-exchanged in the first heat exchanger 210, such that the condensing pressure Pd is lower than the condensing pressure Pd' of the related art by ΔP and the condensing temperature $T_3$ is lower than the condensing temperature $T_2$' of the related art.

The refrigerant passing through the first suction heat exchanger 211 may undergo a process of absorbing heat from the refrigerant passing through the condensing heat exchanger 213 to evaporate (point 6→7, heat quantity Q1').

The non-effective cooling power is the cooling power of a refrigerant having a temperature higher than that of cool air to be supplied to a deep storage compartment, for example, −60° C. or more and is understood as useless cooling power which is difficult to be supplied to the deep storage compartment. That is, in the P-h diagram, since $T_5$ is about −60° C., the cooling power of the refrigerant having a temperature in a range of $T_5$ to $T_7$ may be understood as non-effective cooling power.

As a result, some of the non-effective cooling power may be used to cool the condensing heat exchanger 213 of the first heat exchanger 210 through the first suction heat exchanger 211. In this process, the specific gravity of the liquid refrigerant may be decreased while the refrigerant passing through the first suction heat exchanger 211 evaporates.

The plurality of heat exchangers 210 and 250 includes the second heat exchanger 250 for exchanging heat between the refrigerant flowing through the expansion device 140 and the refrigerant flowing through the suction pipe 165.

The first heat exchanger 210 may be installed at the outlet side of the second heat exchanger 250 with respect to the flow direction of the refrigerant flowing through the suction pipe 165. The second heat exchanger 250 may be installed at the outlet side of the first heat exchanger 210 with respect to the flow direction of the refrigerant flowing through the condensing pipe 161.

Specifically, the second heat exchanger 250 may include a second suction heat exchanger 251 provided at one side of the first suction heat exchanger 211 and the expansion device 140 for exchanging heat with the second suction heat exchanger 251. The second suction heat exchanger 251 may configure at least a portion of the suction pipe 165.

The second suction heat exchanger 251 and the expansion device 140 may be configured to be in contact with each other. For example, the second suction heat exchanger 251 and the expansion device 140 may be coupled by soldering.

When heat is exchanged between the second suction heat exchanger 251 and the expansion device 140, the low-temperature refrigerant flowing through the second suction heat exchanger 251 may cool the high-temperature refrigerant flowing through the expansion device 140. Accordingly, the refrigerant may be decompressed while passing through the expansion device 140, thereby suppressing decrease in dryness in the decompression process.

That is, when the refrigerant passes through the expansion device 140, the pressure and temperature of the refrigerant may be decreased and the ratio of a gaseous refrigerant in the refrigerant may be increased. The gaseous refrigerant adversely affects evaporation performance of the evaporator 150. When the ratio of the gaseous refrigerant is increased, the ratio of the liquid refrigerant which may evaporate is decreased, evaporation performance may be deteriorated.

As a result, since the refrigerant passing through the expansion device 140 may be cooled through the second heat exchanger 250, it is possible to increase the ratio of the liquid refrigerant at the inlet side of the evaporator 150 and to improve evaporation performance.

The first heat exchanger 210 may be installed at the outlet side of the second heat exchanger 250 with respect to the refrigerant flow direction in the suction pipe 165. In other words, the first suction heat exchanger 211 may be installed at the outlet side of the second suction heat exchanger 251.

Accordingly, the refrigerant passing through the evaporator 150 is heat-exchanged in the second heat exchanger 250 and then is heat-exchanged in the first heat exchanger 210, thereby increasing dryness and decreasing non-effective cooling power. As dryness is increased, the suction temperature may be increased and, as the suction temperature is increased, the suction temperature condition of the household compressor 110 may be easily satisfied.

Specifically, referring to FIG. 3, since the refrigerant passing through the first heat exchanger 210 exchanges heat with the second suction heat exchanger 251 while passing the expansion device 140 (heat quantity Q2), the temperature of the refrigerant may be decreased from $T_3$ to $T_4$ and the pressure of the refrigerant may be decreased from Pd to Ps (the state of the refrigerant is moved from point 3 to point 4). Specifically, from a thermodynamic point of view, when the refrigerant exchanges heat with the second suction heat exchanger 251 while passing through the expansion device 140, the state of the refrigerant may be understood as being changed in order of points 3, 3' and 4 (3→3'→4) and the state of the refrigerant is moved from point 3 to point 4. As a result, the refrigerant heat-exchanged in the first heat exchanger 210 is further heat-exchanged in the second heat exchanger 250, thereby decreasing the pressure and temperature of the refrigerant.

The refrigerant passing through the expansion device 140 of the second heat exchanger 250 flows into the evaporator 150 to evaporate. After the refrigerant passes through the evaporator 150, the state of the refrigerant is changed from point 4 to point 5. The temperature $T_4$ at point 4 is about −80° C. and the temperature $T_5$ at point 5 is about −60° C.

Accordingly, the cooling power of the refrigerant between point 4 and point 5 may be effective cooling power sufficient to cool the cool air to be supplied to the storage compartment of the deep freezer.

The refrigerant passing through the evaporator 150 absorbs heat from the refrigerant passing through the expansion device 140 to evaporate while passing through the second suction heat exchanger 251 of the second heat exchanger 250 (point 5→6, heat quantity Q2'). The cooling power of the refrigerant between point 5 and point 6 corresponds to the temperature of −60° C. or more and is non-effective cooling power.

However, the heat quantity Q2' may be used to cool the expansion device 140 of the second heat exchanger 250 through the second suction heat exchanger 251. In this process, the refrigerant passing through the second suction heat exchanger 251 may decrease the specific gravity of the liquid refrigerant while evaporating.

In summary, Q1' and Q2' is non-effective cooling power, but may be used to cool the condensing heat exchanger 213 of the first heat exchanger 210 and the expansion device 140 of the second heat exchanger 250. In this process, the refrigerant passing through the first and second suction heat exchangers 211 and 251 may decrease the specific gravity of the liquid refrigerant while evaporating.

The deep freezer 10 further includes a heat exchanger connection pipe 260 disposed between the first heat exchanger 210 and the second heat exchanger 250. The heat exchanger connection pipe 260 may configure a portion of the condensing pipe 161 and may be configure to connect the first heat exchanger 210 with the second heat exchanger 250.

Since the first heat exchanger 210 and the second heat exchanger 250 are spaced apart from each other by the heat exchanger connection pipe 260, it is possible to prevent heat exchange between the first and second heat exchangers 210 and 250. That is, it is possible to prevent heat exchange between the condensing heat exchanger 213 and the expansion device 140.

If heat is exchanged between the condensing heat exchanger 213 and the expansion device 140, the cooling effect of the expansion device 140 may be reduced. Accordingly, in the present embodiment, the heat exchanger connection pipe 260 is provided between the first and second heat exchanger 210 and 250, thereby solving such a problem.

FIG. 4 shows the result of changing the amount of consumed energy and the suction temperature of the compressor according to the length of the first heat exchanger 210, that is, the length of the first suction heat exchanger 211 or the condensing heat exchanger 213.

As the length of the first heat exchanger 210 is increased, that is, as the amount of heat exchanged by the first heat exchanger 210 is increased, absorption of heat of the refrigerant sucked into the compressor 110 is increased, the suction temperature of the compressor 110 is increased. The amount of consumed energy according to operation of the deep freezer 10 is decreased.

Based on the operation condition of the household compressor 110 according to the present embodiment, the suction temperature Ts of the compressor 110 may satisfy the following equation with respect to the ambient temperature (room temperature, To).

$$To-5°\ C.<Ts<To+5°\ C.$$

As the suction temperature Ts of the compressor 110 is increased, it is possible to prevent the liquid refrigerant from being sucked into the compressor 110 and to reduce non-effective cooling power. However, when the suction temperature Ts of the compressor 110 is excessively increased, the discharge temperature or discharge pressure of the compressor 110 may be excessively increased. As a result, in order to set the operation condition of the household compressor 110 according to the embodiment and the appropriate discharge temperature of the compressor, it is preferable that the suction temperature Ts of the compressor 110 satisfies the above equation.

In FIG. 4, the length of the first heat exchanger 210 for satisfying the condition of the suction temperature Ts of the compressor 110 may be about 3.5 to 5 m. That is, when the length condition of the first heat exchanger 210 is satisfied, it is possible to satisfy the operation condition of the household compressor 110 according to the present embodiment and to improve the operation reliability of the compressor.

Meanwhile, the diameter of the pipe of the condensing heat exchanger 213 may be greater than that of the pipe of the expansion device 140. The diameter of the pipe of the condensing heat exchanger 213 may be 3.5 times to 4.5 times the diameter of the pipe of the expansion device 140. Specifically, the diameter of the pipe of the condensing heat exchanger 213 may be 3.5 mm and the diameter of the pipe of the expansion device 140 may be 0.8 mm.

The refrigerant passing through the condensing heat exchanger 213 should be condensed. In contrast, the refrigerant passing through the expansion device 140 should be decompressed. Referring to the P-h diagram of FIG. 3, the dryness of the outlet state (point 4) of the expansion device 140 is higher than that of the inlet state (point 3) of the expansion device. That is, vaporization occurs together with decompression when the refrigerant passes through the expansion device 140.

In summary, since the purpose of the expansion device 140 is to decompress the refrigerant, the refrigerant may be decompressed by decreasing the diameter of the pipe and increasing the flow rate of the refrigerant. In contrast, if the diameter of the pipe of the condensing heat exchanger 213 is too small, the condensing heat exchanger 213 acts as resistance against the refrigerant, such that the flow rate of the refrigerant is reduced and the pressure of the refrigerant is reduced, but condensation of the refrigerant may be limited.

Accordingly, in the present embodiment, the diameter of the pipe of the condensing heat exchanger 213 is sufficiently greater than the diameter of the pipe of the expansion device 140, thereby preventing the condensing heat exchanger 213 from acting as resistance against the refrigerant. In this case, the gaseous refrigerant having a relatively large volume may easily flow through the condensing heat exchanger 213 and may be sufficiently condensed in the process of exchanging heat in the first heat exchanger 210.

Hereinafter, second to fifth embodiments of the present invention will be described. These embodiments are different from the first embodiment in some components and thus a difference therebetween will be focused upon. For the same portions as the first embodiments, refer to the description and the reference numerals of the first embodiment.

Figure 6:
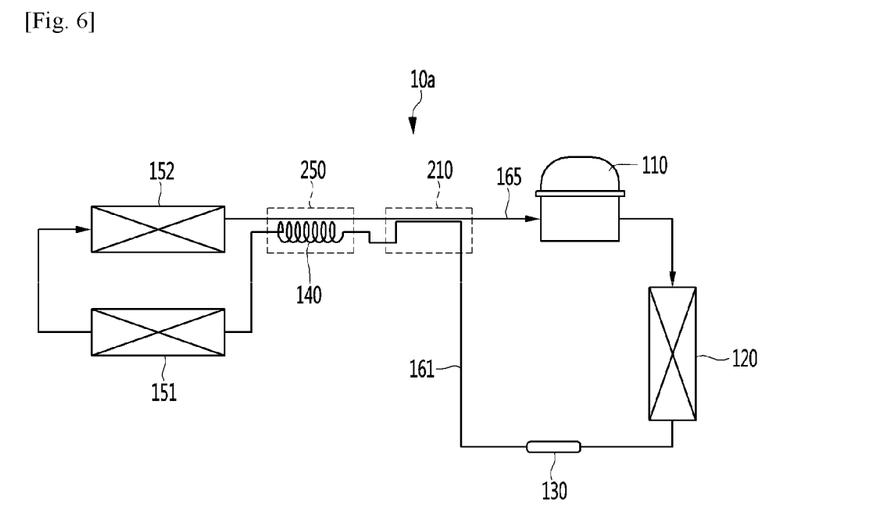
FIG. 6 is a view showing a freezing cycle of a deep freezer according to a second embodiment of the present invention.

FIG. 6 is a view showing a freezing cycle of a deep freezer according to a second embodiment of the present invention.

Referring to FIG. 6, the deep freezer 10a according to the second embodiment of the present invention includes a compressor 110, a condenser 120, a drier 130, an expansion device 140, and a condensing pipe 161 extending from the condenser 120 to the expansion device 140.

The deep freezer 10a further includes a first heat exchanger 210 for exchanging heat between the condensed refrigerant and the refrigerant sucked into the compressor 110 and a second heat exchanger 250 for exchanging heat between the refrigerant passing through the expansion device 140 and the sucked refrigerant.

For the above-described components, refer to the description of the first embodiment.

The deep freezer 10a further includes a plurality of evaporators 151 and 152 for evaporating the refrigerant decompressed in the expansion device 140.

The plurality of evaporators 151 and 152 includes the first evaporator 151 installed at the outlet side of the expansion device 140 and the second evaporator 152 installed at the outlet side of the first evaporator 151. The first and second evaporators 151 and 152 may be connected in series.

The deep freezer 10a may include a plurality of storage compartments corresponding to the plurality of evaporators 151 and 152. The plurality of storage compartments may include a very-low-temperature storage compartment having a very low temperature of −60° C. or less and a freezing compartment having a temperature of −20° C. For example, cool air generated in the first evaporator 151 may be supplied to the very-low-temperature storage compartment and the cool air generated in the second evaporator 152 may be supplied to the freezing compartment.

The second heat exchanger 250 may be installed at the outlet side of the second evaporator 152 and the first heat exchanger 210 may be installed at the outlet side of the second heat exchanger 250. Heat of the refrigerant evaporated in the second evaporator 152 may be absorbed while the refrigerant evaporated in the second evaporator 152 passes through the second heat exchanger 250 and the first heat exchanger 210, and the temperature of the refrigerant sucked into the compressor 110 may be increased, thereby increasing dryness.

Figure 7:
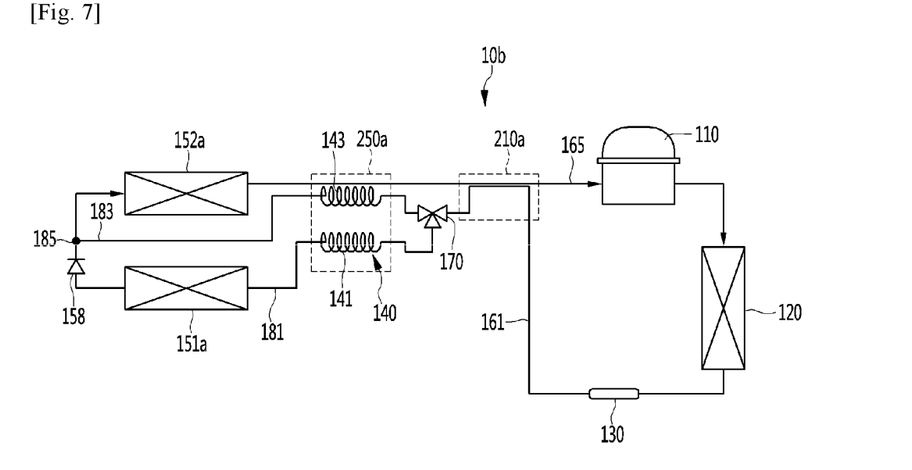
FIG. 7 is a view showing a freezing cycle of a deep freezer according to a third embodiment of the present invention.

FIG. 7 is a view showing a freezing cycle of a deep freezer according to a third embodiment of the present invention.

Referring to FIG. 7, the deep freezer 10b according to the third embodiment of the present invention includes a compressor 110, a condenser 120, a drier 130, an expansion device 140, and a condensing pipe 161 extending from the condenser 120 to the expansion device 140.

The expansion device 140 includes two expansion devices. The two expansion devices include a first expansion device 141, through which at least some of the refrigerant flowing through the condensing pipe 161 may flow, and a second expansion device 143 connected to the first expansion device 141 in parallel to allow the other of the refrigerant flowing through the condensing pipe 161 to flow therein.

A valve device 170 for introducing the refrigerant flowing through the condensing pipe 161 into at least one expansion device 143 of the first expansion device 141 and the second expansion device 143 may be installed in the condensing pipe 161. For example, the valve device 170 may include a three-way valve. The condensing pipe 161 is connected to the inlet of the three-way valve and the first and second expansion devices 141 and 143 may be connected to the two outlets of the three-way valve.

The deep freezer 10b further includes a first evaporator 151a connected to the outlet side of the first expansion device 141 and a second evaporator 152a connected to the outlet side of the second expansion device 143. The deep freezer 10b further includes a first evaporation pipe 181 extending from the first outlet of the valve device 170 to the first evaporator 151a and a second evaporation pipe 183 extending the second outlet of the valve device 170 to the second evaporator 152a.

The first evaporation pipe 181 and the second evaporation pipe 183 may be coupled at a joint part 185. The joint part 185 may be a point of the first evaporation pipe 181 or the second evaporation pipe 183. By this configuration, the first evaporator 151a and the second evaporator 152 may be connected in parallel.

A check valve 158 for guiding the unidirectional flow of the refrigerant in the first evaporation pipe 181 may be installed in the first evaporation pipe 181. By the check valve 158, flow of the refrigerant from the joint part 185 to the first evaporator 151a may be restricted. As a result, the refrigerant passing through the second evaporator 152a may be prevented from flowing into the first evaporator 151a through the joint part 185.

At least one of the first and second evaporators 151a and 152a may operate by controlling the valve device 170. When the first outlet of the two outlets of the valve device 170 is opened and the second outlet is closed, only flow of the refrigerant from the valve device 170 to the first evaporator 151a may occur.

In contrast, when the second outlet of the two outlets of the valve device 170 is opened and the first outlet is closed, only flow of the refrigerant from the valve device 170 to the second evaporator 151a may occur. Of course, when both the two outlets of the valve device 170 are opened, the refrigerant flowing into the valve device 170 may be branched into the first and second evaporators 151a and 152a through the first and second outlets.

The deep freezer 10b may include a plurality of storage compartments corresponding to the plurality of evaporators 151a and 152a. The plurality of storage compartments may include a very-low-temperature storage compartment having a very low temperature of −60° C. or less and a freezing compartment having a temperature of −20° C.

The refrigerant passing through the first evaporator 151a or the second evaporator 152a may pass through the second heat exchanger 250a. The second heat exchanger 250a may include the first expansion device 141, the second expansion device 143 and at least a portion of the suction pipe 165, that is, the second suction heat exchanger 251 described in the first embodiment.

The first and second expansion devices 141 and 143 and the second suction heat exchanger 251 may be disposed to be in contact with each other. For example, the first and second expansion devices 141 and 143 and the second suction heat exchanger 251 may be coupled by soldering.

A first heat exchanger 210a may be installed at the outlet side of the second heat exchanger 250a. The first heat exchanger 210a may include at least a portion of the condensing pipe 161, that is, the condensing heat exchanger 213 described in the first embodiment, and at least a portion of the suction pipe 165, that is, the first suction heat exchanger 211. For operation of the first heat exchanger 210a and the second heat exchanger 250a, refer to the description of the first embodiment.

Figure 8:
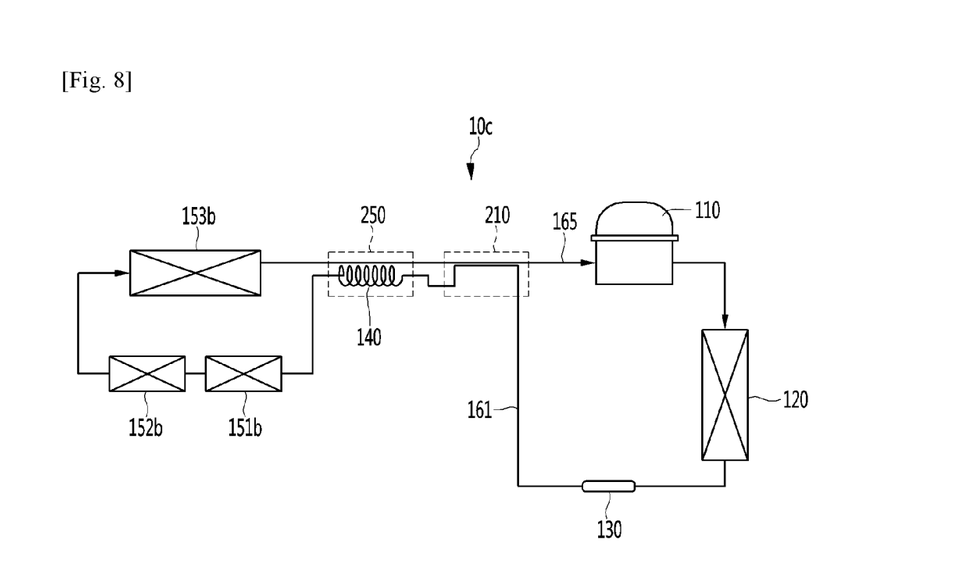
FIG. 8 is a view showing a freezing cycle of a deep freezer according to a fourth embodiment of the present invention.

FIG. 8 is a view showing a freezing cycle of a deep freezer according to a fourth embodiment of the present invention.

Referring to FIG. 8, the deep freezer 10c according to the fourth embodiment of the present invention includes a compressor 110, a condenser 120, a drier 130, an expansion device 140 and a condensing pipe 161 extending from the condenser 120 to the expansion device 140.

The deep freezer 10c further includes a first heat exchanger 210 for exchanging heat between the condensed refrigerant and the refrigerant sucked into the compressor 110 and a second heat exchanger 250 for exchanging heat between the refrigerant passing through the expansion device 140 and the sucked refrigerant.

For the above-described components, refer to the description of the first embodiment.

The deep freezer 10c further includes a plurality of evaporators 151b, 152b and 153b for evaporating the refrigerant decompressed in the expansion device 140.

The plurality of evaporators 151b, 152b and 153b includes the first evaporator 151b installed at the outlet side of the expansion device 140, the second evaporator 152b installed at the outlet side of the first evaporator 151b and the third evaporator 153b installed at the outlet side of the second evaporator 152b. The first, second and third evaporators 151b, 152b and 153b may be connected in series.

The deep freezer 10c may include a plurality of storage compartments corresponding to the plurality of evaporators 151b, 152b and 153b. The plurality of storage compartments may include a very-low-temperature storage compartment having a very low temperature of −60° C. or less, a freezing compartment having a temperature of −20° C., and a refrigerating compartment having a temperature of 0 to 5° C. For example, cool air generated in the first evaporator 151b may be supplied to the very-low-temperature storage compartment, the cool air generated in the second evaporator 152b may be supplied to the freezing compartment, and cool air generated in the third evaporator 153b may be supplied to the refrigerating compartment.

The second heat exchanger 250 may be installed at the outlet side of the third evaporator 153b and the first heat exchanger 210 may be installed at the outlet side of the second heat exchanger 250. Heat of the refrigerant evaporated in the second evaporator 152 is absorbed while the refrigerant evaporated in the second evaporator 152 passes through the second heat exchanger 250 and the first heat exchanger 210 and the temperature of the refrigerant sucked into the compressor 110 may be increased, thereby increasing dryness. For this, refer to the description of the first embodiment.

Figure 9:
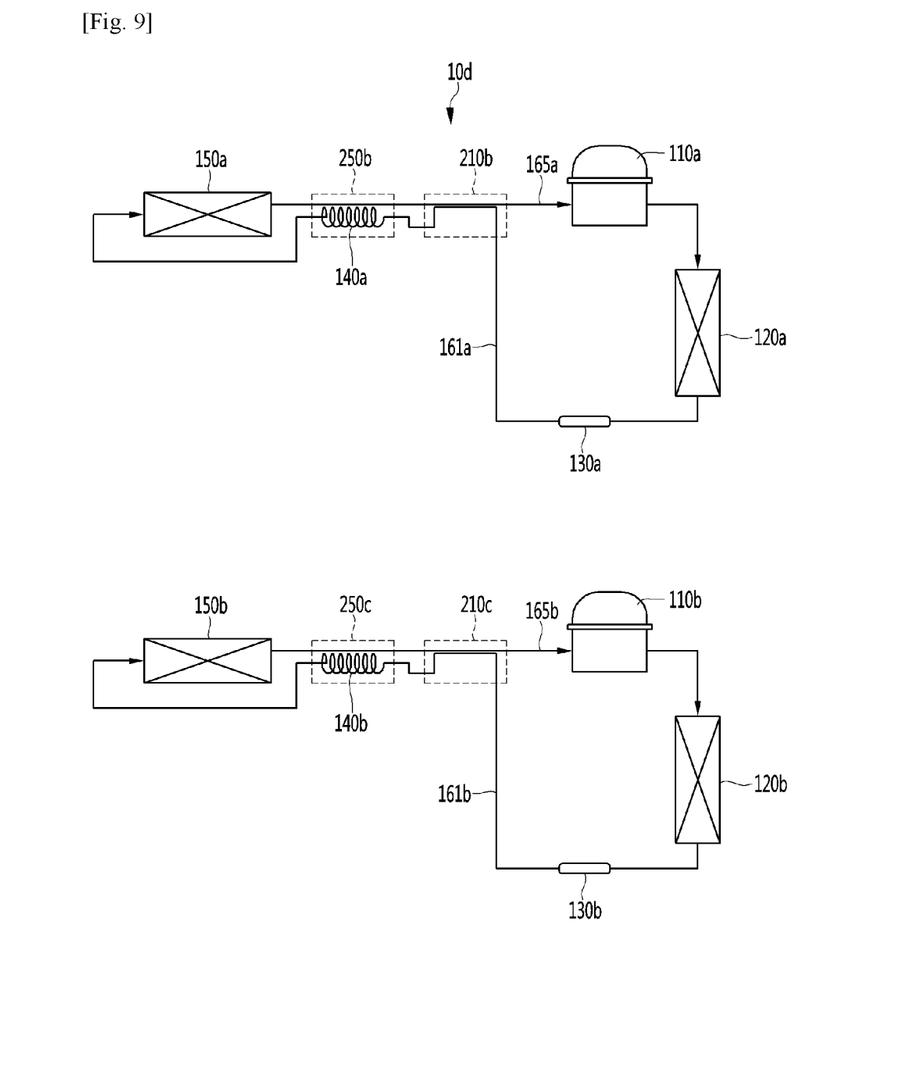
FIG. 9 is a view showing a freezing cycle of a deep freezer according to a fifth embodiment of the present invention.

FIG. 9 is a view showing a freezing cycle of a deep freezer according to a fifth embodiment of the present invention.

Referring to FIG. 9, the deep freezer 10d according to the fifth embodiment of the present invention includes two independent freezing cycles. The configurations of the two independent freezing cycles are equal to each other.

The two freezing cycles include a first freezing cycle. Specifically, the first freezing cycle includes a first compressor 110a, a first condenser 120a, a first drier 130a, a first expansion device 140a, a first condensing pipe 161a, a first evaporator 150a, a first suction pipe 165a, a second heat exchanger 250b and a first heat exchanger 210b. For the configuration and operation of these components, refer to the description of the first embodiment.

The two freezing cycles include a second freezing cycle. Specifically, the freezing cycle includes a second compressor 110b, a second condenser 120b, a second drier 130b, a second expansion device 140b, a second condensing pipe 161b, a second evaporator 150b, a second suction pipe 165b, a fourth heat exchanger 250c and a third heat exchanger 210c. For the configuration and operation of these components, refer to the description of the first embodiment.

According to the present embodiment, the two independent freezing cycles operate to cool the plurality of storage compartments provided in the deep freezer 10d. The plurality of storage compartments includes two very-low-temperature storage compartments having a temperature of −60° C.

or less. The cool air generated in the first freezing compartment may cool the first very-low-temperature storage compartment and the cool air generated in the second freezing compartment may cool the second very-low-temperature storage compartment.

INDUSTRIAL APPLICABILITY

According to the embodiments of the present invention, the refrigerant condensed in the condenser passes through the plurality of heat exchangers before flowing into the evaporator, thereby decreasing the condensing pressure of the freezing cycle and preventing dryness from being increased when the condensed refrigerant passes through the expansion device. Therefore, the present invention has remarkable industrial applicability.

The invention claimed is:

1. A deep freezer comprising:
   a compressor configured to compress a mixture of two or more refrigerants;
   a condenser configured to condense the refrigerant mixture compressed in the compressor;
   an expansion device configured to decompress the refrigerant mixture condensed in the condenser, the expansion device including a first capillary and a second capillary;
   an evaporator configured to evaporate the refrigerant mixture decompressed in the expansion device, the evaporator including a first evaporator and a second evaporator;
   a condensing pipe that extends from an outlet side of the condenser to the expansion device to guide flow of the refrigerant mixture, the condensing pipe including a condensing heat exchanger;
   a suction pipe that extends from an outlet side of the evaporator to the compressor to guide suction of the refrigerant mixture into the compressor, the suction pipe including a first suction heat exchanger and a second suction heat exchanger;
   a plurality of heat exchangers installed in the suction pipe to perform heat exchange of the refrigerant mixture sucked into the compressor, the plurality of heat exchangers comprising:
      a first heat exchanger that includes the first suction heat exchanger configured to guide flow of the refrigerant mixture sucked into the compressor and the condensing heat exchanger configured to perform heat exchange with the first suction heat exchanger, and
      a second heat exchanger that includes the second suction heat exchanger located at one side of the first suction heat exchanger to guide flow of the refrigerant mixture sucked into the compressor and the first and second capillaries configured to perform heat exchange with the second suction heat exchanger;
   a three-way valve that includes an inlet to which the condensing heat exchanger is connected and two outlets to which the first and second capillaries are connected;
   a first evaporation pipe configured to connect the three-way valve to the first evaporator; and
   a second evaporation pipe configured to connect the three-way valve to the second evaporator, the second evaporation pipe being connected to a joint part of the first evaporation pipe,
   wherein the first suction heat exchanger is coupled to the condensing heat exchanger, and the first capillary is coupled to the second suction heat exchanger and the second capillary.

2. The deep freezer according to claim 1, wherein a diameter of a pipe of the condensing heat exchanger is greater than that of the first capillary or the second capillary.

3. The deep freezer according to claim 2, wherein a diameter of a pipe of the condensing heat exchanger is 3.5 times to 4.5 times that of the first capillary or the second capillary.

4. The deep freezer according to claim 1, wherein the first suction heat exchanger and the condensing pipe, or the second suction heat exchanger and the first and the second capillaries are in contact with each other to perform heat exchange.

5. The deep freezer according to claim 1, further comprising a heat exchanger connection pipe disposed between the first and second heat exchangers to prevent heat exchange between the expansion device and the condensing heat exchanger,
   wherein the first heat exchanger and the second heat exchanger are spaced apart from each other by the heat exchanger connection pipe.

6. The deep freezer according to claim 1, wherein the first heat exchanger is installed at an outlet side of the second heat exchanger with respect to a flow direction of the refrigerant flowing through the suction pipe.

7. The deep freezer according to claim 1, wherein the second heat exchanger is installed at an outlet side of the first heat exchanger with respect to a flow direction of the refrigerant flowing through the condensing pipe.

8. The deep freezer according to claim 1,
   wherein the second evaporator is installed at an outlet side of the first evaporator.

9. The deep freezer according to claim 1, wherein the refrigerant mixture includes:
   a high-temperature refrigerant selected from one of N-butane, 1-butane and isobutene; and
   a low-temperature refrigerant composed of ethylene.

10. The deep freezer according to claim 9, wherein the N-butane is in a range of 80 wt % to 85 wt %, and the ethylene is in a range of 15 wt % to 20 wt %.

11. The deep freezer according to claim 9,
    wherein the compressor operates in a set pressure range, and
    wherein the set pressure range includes a maximum discharge pressure of the compressor of 25 bar or less and a minimum suction pressure of the compressor of 1 bar or more.

12. The deep freezer according to claim 9,
    wherein the compressor operates in a set temperature range, and
    wherein the set temperature range includes a maximum discharge temperature of the compressor of 120° C. or less.

13. The deep freezer according to claim 9, wherein the deep freezer includes a storage compartment having a temperature value of −60° C. or less.

14. The deep freezer according to claim 1, wherein a length of the first suction heat exchanger or the condensing heat exchanger is in a range of 3.5 m to 5 m.

* * * * *